US012111239B2

(12) United States Patent
Shaiken

(10) Patent No.: US 12,111,239 B2
(45) Date of Patent: Oct. 8, 2024

(54) METHODS AND KITS FOR ISOLATING WHOLE CELLS FROM FROZEN TISSUES FOR CELL FINGERPRINTING

(71) Applicant: Peri-Nuc Labs LLC, Houston, TX (US)

(72) Inventor: Tattym E. Shaiken, Houston, TX (US)

(73) Assignee: PERI-NUC LABS, LLC, Houston, TX (US)

( * ) Notice: Subject to any disclaimer, the term of this patent is extended or adjusted under 35 U.S.C. 154(b) by 827 days.

(21) Appl. No.: 17/308,393

(22) Filed: May 5, 2021

(65) Prior Publication Data

US 2021/0348993 A1 Nov. 11, 2021

Related U.S. Application Data

(60) Provisional application No. 63/020,770, filed on May 6, 2020.

(51) Int. Cl.
*G01N 1/28* (2006.01)
*B01L 3/02* (2006.01)
*G01N 1/40* (2006.01)

(52) U.S. Cl.
CPC ............ *G01N 1/4055* (2013.01); *B01L 3/021* (2013.01); *G01N 1/286* (2013.01); *G01N 1/4077* (2013.01); *G01N 2001/2873* (2013.01)

(58) Field of Classification Search
CPC .............................................. G01N 2001/2866
See application file for complete search history.

(56) References Cited

FOREIGN PATENT DOCUMENTS

WO WO-2011104692 A2 * 9/2011 ......... A61B 10/0266

\* cited by examiner

*Primary Examiner* — Rosanne Kosson
(74) *Attorney, Agent, or Firm* — William R. Childs; Childs Patent Law PLLC

(57) ABSTRACT

The present disclosure relates to methods for isolating whole cells from frozen tissue samples. The present disclosure further provides kits for obtaining isolated whole cells from a frozen tissue sample. One benefit to the methods and kits can be the rapid isolation of whole cells from frozen tissues upon thawing. Another benefit to the methods and kits disclosed herein can be the rapid and efficient extraction of isolated whole cells from stroma material in frozen tissues. Another benefit to the methods and kits disclosed herein can be the isolation of whole cells from frozen tissues suitable for subsequent biochemical analysis.

12 Claims, 5 Drawing Sheets

METHODS AND KITS FOR ISOLATING WHOLE CELLS FROM FROZEN TISSUES FOR CELL FINGERPRINTING

CROSS-REFERENCE TO RELATED APPLICATIONS

This application claims the benefit of U.S. Provisional Application No. 63/020,770, filed on May 6, 2020 which is incorporated by reference herein in its entirety.

TECHNICAL FIELD

The present disclosure relates to methods for isolating whole cells from frozen tissue samples. The present disclosure further provides kits for obtaining isolated whole cells from a frozen tissue sample. One benefit to the methods and kits can be the rapid isolation of whole cells from frozen tissues upon thawing. Another benefit to the methods and kits disclosed herein can be the rapid and efficient extraction of isolated whole cells from stroma material in frozen tissues. Another benefit to the methods and kits disclosed herein can be the isolation of whole cells from frozen tissues suitable for subsequent biochemical analysis.

BACKGROUND

Cell researchers have long faced a problem with analyzing cells. Ideally, they would study living cells in their native environment with no changes to the cell. However, most cells are located in living organisms, which can make studying them impractical while those cells are located in the living organisms. It is possible to extract living cells from cut up tissues, treat them with detergent, and homogenize the sample to analyze the components of the cell. However, these methods, while suitable for some studies, disrupt the cell and prevent analysis of the cellular components in the context of the cell. It is possible to extract living cells from organisms and grow them for research. However, growing cells outside of the organism changes the cell, because the stroma, which are supporting tissues, are not present. As with cells from normal tissues, growing tumor cells in culture media can change the biochemistry of the cells entirely. These methods force the researcher to analyze the cell and then extrapolate to determine the characteristics of the natural cell.

Cryopreservation techniques have been used to preserve living tissues for research or medical purposes, and for subsequent analysis of cell structure and function. Freezing procedures can preserve the cells within tissues for prolonged periods of time in a viable state, and can even preserve the integrity of subcellular constituents and ultrastructure. However, conventional cryopreservation methods use at least one cryoprotective agent (CPA) to render the water inside and outside of cells vitreous, in order to reduce the formation of ice crystals that damage cellular integrity upon freezing. These methods can allow slower freezing while avoiding damage and distortion of tissues due to ice crystal formation. However, the addition of CPAs tends to distort analysis because they are cytotoxic and tend to introduce deleterious side effects on cellular integrity.

Methods of CPA-free cryopreservation of cells and tissues have been developed, including flash or "snap" freezing and ultra-rapid cooling using inkjet cell printing. These techniques freeze the tissues and cells so rapidly that water does not have time to form crystals, but remains in a vitreous form that does not expand when it solidifies. Snap freezing at −80° C. or below, or in liquid nitrogen, can preserve the biochemical structure and identity of whole cells in the frozen tissues, including tumor cells. A challenge that arises with flash freezing techniques, however, is that conventional freeze/thaw protocols can lead to marked changes in cellular structure and function. These changes present difficulties for the accurate study of the structure and function of cells as they exist in living tissues.

The human body is believed to contain over 200 cell types that make up some 80 different organs, all having the same genome; their varied morphology depends on differences in protein expression. The protein composition of a cell, or the proteome, determines the particular cell type. Cancer cells and healthy cells might have the same set of genes, but they express proteins differently; aberrant protein expression in malignant cells results in an abnormal proteome, which can lead to cancer. An accurate biochemical analysis of protein expression patterns in malignant cells, or the malignant cell proteome, is therefore highly desirable to characterizing tumors, and how they grow and survive drug treatment.

Tumors have been studied by genetic characterization and histopathology, and cancer cell culture models have been applied for proteomics techniques. These techniques have provided certain information about tumor cell genetic makeup and morphology, and yet many important questions remain about how tumors live and prosper in the body, become quiescent, or metastasize, and what "cell fingerprints", or proteomes, lead to these states in malignant cells. It is the patterns of protein expression products of genes in cells, more than the sequences of the genes themselves, which eventually determine malignancy or normalcy; thus, technologies that can enable the accurate characterization of cell fingerprints of various types of tumors would be of great benefit to cancer research and oncology.

There is a need for technologies that can enable the rapid isolation of whole cells from frozen tissue samples. There is a need for technologies that can enable the extraction of whole cells directly from the surrounding stroma material in frozen tissue samples. There is a need for technologies that can enable accurate biochemical characterization, including the analysis of proteomes, of malignant cells as they exist in a native tumor environment.

SUMMARY

A method of isolating whole cells from a frozen tissue sample is disclosed. In an embodiment, the method includes: providing a frozen tissue sample, wherein the frozen tissue sample contains whole cells and stroma material; cutting the frozen tissue sample into two or more tissue pieces using a tissue sample cutter, wherein the tissue sample cutter has a plurality of cutting blades; forming an extraction mixture by incubating the two or more tissue pieces in a volume of tissue sample solution (TSS) for an incubation period; forming a whole cell sample by pipetting a first portion of the extraction mixture from the tissue sample solution into an extraction pipette, and then pipetting a second portion of the extraction mixture from the extraction pipette into a supernatant; and collecting isolated whole cells from the whole cell sample by flowing the extraction mixture through a separation funnel into a collection vessel. In an embodiment, the tissue sample is a tumor sample, or the whole cells are tumor cells.

An embodiment of the method includes maintaining the frozen tissue at a temperature of about 0 degrees Celsius to about 4 degrees Celsius before and during cutting. In an embodiment of the method, the tissue sample has a weight of from about 1 gram to about 5 grams. In another embodiment, the two or more tissue pieces have a width of from about 2 mm to about 6 mm. In another embodiment, the incubation period is from about 3 minutes to about 5 minutes. In another embodiment, incubating the tissue pieces includes shaking the extraction mixture during a portion of the incubation period. In another embodiment, the pipetting is performed for a pipetting period of from about 3 minutes to about 5 minutes.

In an embodiment, provided that stroma material is present in the whole cell sample, the method further includes reducing an amount of stroma material in the whole cell sample by flowing the extraction mixture through a separation funnel into a collection vessel. In an embodiment, the method includes further reducing an amount of stroma in the whole cell sample by flowing the supernatant from the collection vessel through the separation funnel or a second separation funnel into a second collection vessel.

Embodiments of methods herein include: forming a pellet of whole cells by centrifuging the supernatant in the collection vessel; removing the supernatant from the collection vessel; forming a washed cell suspension by suspending the pellet in a volume of cell wash solution (CWS); forming a washed cell pellet and a washed cell supernatant by centrifuging the washed cell suspension; and forming a sample of isolated whole cells by removing the washed cell supernatant from the washed cell pellet. In an embodiment, the centrifuging is performed at a gravitational force of from about 80 g to about 120 g and for a centrifuge period of from about 3 minutes to about 7 minutes.

In embodiments of the methods herein, the TSS includes from about 10 mM to about 40 mM Hepes, from about 0 mM to about 120 mM KCl, from 0 mM to about 150 mM NaCl, from 0 mM to about 10 mM $MgCl_2$, from 0 μM to about 2 μM $CaCl_2$, and from 0% to about 10% glycerol. In embodiments of the methods herein, the CWS includes from about 10 mM to about 40 mM Hepes, from 0 mM to about 120 mM KCl, from 0 mM to about 150 mM NaCl, from 0 mM to about 10 mM $MgCl_2$, from 0 μM to about 2 μM $CaCl_2$, and from 0% to about 10% glycerol.

In embodiments of methods herein, the TSS includes at least one protease inhibitor, at least one phosphatase inhibitor, at least one DNAse inhibitor, at least one RNase inhibitor, or a combination thereof. In certain embodiments of such methods, the method further includes performing at least one biochemical analysis on the isolated whole cells. In certain embodiments, the at least one biochemical analysis includes protein analysis, phosphorylated protein analysis, nucleic acid analysis, or a combination thereof.

Kits for obtaining isolated whole cells from a frozen tissue sample are disclosed. In various embodiments, the kit includes: a tissue sample cutter, wherein the tissue sample cutter has a plurality of cutting blades; at least one extraction pipette; at least one separation funnel; at least one vessel containing a volume of tissue sample solution (TSS); and at least one vessel containing a volume of cell washing solution (CWS). In some embodiments, the kit further includes at least one collection vessel.

In certain embodiments, the tissue sample cutter includes a handle having the plurality of cutting blades attached thereto. In certain embodiments, the plurality of cutting blades extend in a substantially parallel direction from the handle. In certain embodiments, the plurality of blades has a plurality of cutting edges located a distance of from about 1 cm to about 2 cm distance from the handle. In certain embodiments, the plurality of cutting blades includes from 2 to 8 cutting blades. In some embodiments, the plurality of cutting blades includes razor blades having a length of from about 3 cm to about 5 cm, and a height of from about 1 cm to about 2 cm. In certain embodiments, the cutting blades include a spacing of from about 2 mm to about 6 mm between the cutting edges.

In various embodiments, the at least one extraction pipette includes a bulb portion and a fluid transport portion. In certain embodiments, the bulb portion has a maximum internal diameter of from about 15 mm to about 25 mm. In certain embodiments, the fluid transport portion includes a substantially straight portion having a length of from about 50 mm to about 90 mm and a maximum bore diameter of from about 5 mm to about 15 mm, and a tapered portion having a length of from about 5 mm to about 15 mm, and a minimum internal diameter of from about 5 mm to about 10 mm. In certain embodiments, the at least one extraction pipette includes a transfer pipette formed of a flexible plastic material.

In various embodiments, the at least one separation funnel includes: a first funnel portion having a maximum internal diameter of from about 18 mm to about 22 mm, a first funnel length of from about 8 mm to about 12 mm, and a first taper joint connected to an end thereof, the first taper joint having a maximum internal diameter of from about 2 mm to about 6 mm and forming a minimum internal diameter of the first funnel portion of from about 10 mm to about 12 mm; a second funnel portion connected to the first taper joint and having a maximum internal diameter of from about 10 mm to about 12 mm, a second funnel length of from about 50 mm to about 70 mm, and a second taper joint connected to an end thereof, the second taper joint having an internal diameter of from about 3 mm to about 5 mm; and a third funnel portion connected to the second taper joint, having an internal diameter of from about 3 mm to about 5 mm and a third funnel length of from about 25 mm to about 35 mm. In certain embodiments, the first taper joint and the second taper joint have a taper angle relative to the first funnel portion or the second funnel portion of from about 10 degrees to about 45 degrees. In certain embodiments, the separation funnel is formed of a single piece of a plastic material.

In embodiments of kits herein, the TSS includes 50-70 mM Hepes, 0.3-0.5 M KCl, 10-30 mM NaCl, 6-10 mM $MgCl_2$, 1-3 μM $CaCl_2$, and 2-6% glycerol. In certain embodiments, the CWS includes 50-70 mM Hepes, 0.3-0.5 M KCl, 10-30 mM NaCl, 6-10 mM $MgCl_2$, 1-3 μM $CaCl_2$, and 2-6% glycerol. In certain embodiments, the TSS includes at least one protease inhibitor, at least one phosphatase inhibitor, at least one DNAse inhibitor, at least one RNase inhibitor, or a combination thereof.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

DETAILED DESCRIPTION

Figure 1:
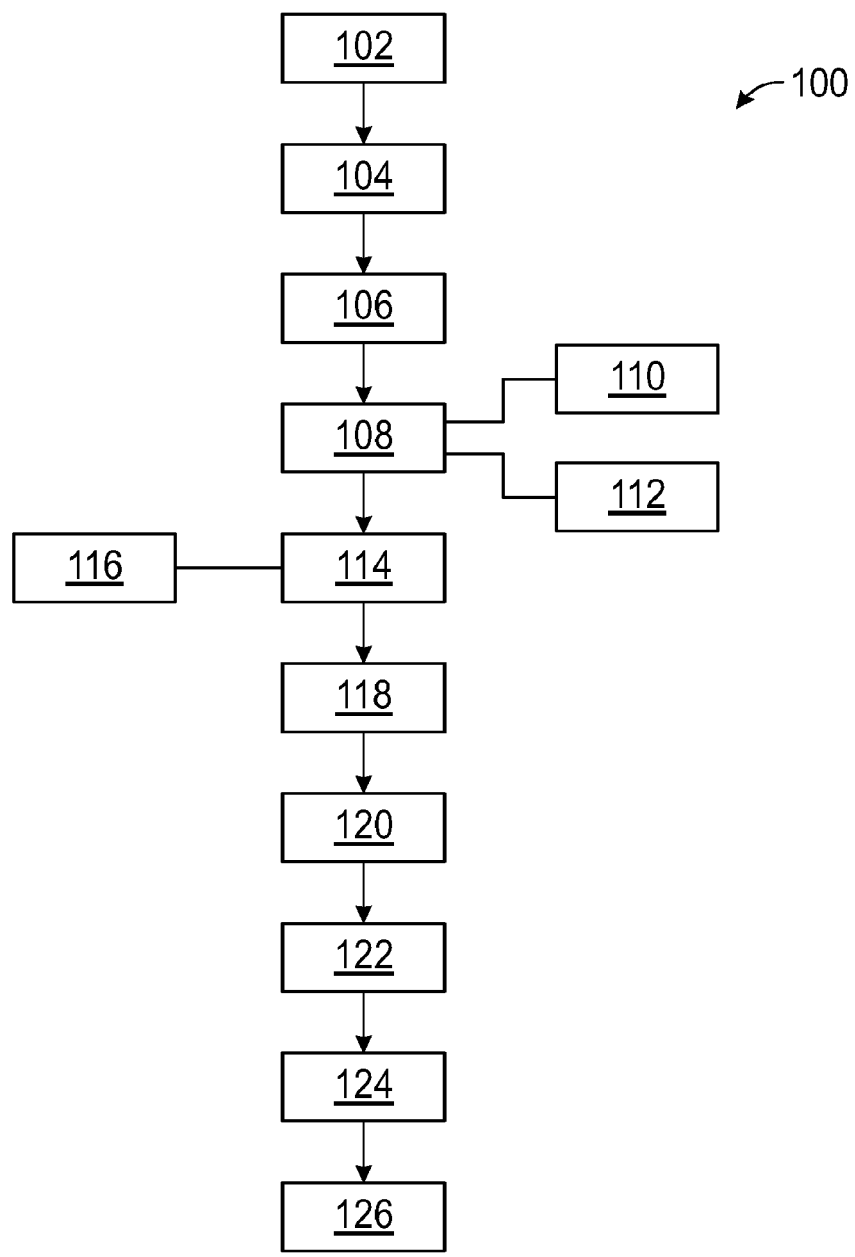
FIG. 1 is a flow diagram of an embodiment of a method of isolating whole cells from a frozen tissue sample.

Unless otherwise noted, all measurements are in standard metric units.

Unless otherwise noted, all instances of the words "a," "an," or "the" can refer to one or more than one of the word that they modify.

Unless otherwise noted, the phrase "at least one of" means one or more than one of an object. For example, "at least one extraction pipette" means a single extraction pipette, more than one extraction pipette, or any combination thereof.

Unless otherwise noted, the term "about" refers to ±10% of the non-percentage number that is described, rounded to the nearest whole integer. For example, about 10 mm, would include 9 to 11 mm. Unless otherwise noted, the term "about" refers to ±5% of a percentage number. For example, about 10% would include 5 to 15%. When the term "about" is discussed in terms of a range, then the term refers to the appropriate amount less than the lower limit and more than the upper limit. For example, from about 10 to about 12 mm would include from 9 to 13 mm.

Unless otherwise noted, properties (height, width, length, ratio etc.) as described herein are understood to be averaged measurements.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

As used herein, "inhibitor," refers to a substance that inhibits or reduces the activity of one or more enzymes.

As used herein, the term "fraction" or "fractionation" in reference to cells refers to whole cells isolated from surrounding tissue or from stroma material, or components of whole cells separated from one or more other cellular components.

As used herein, the term "whole cell" refers to a cell of one or more whole cell types including, but not limited to, epithelial cells, fibroblasts, malignant cells, benign cells, organ cells, and combinations thereof, having an overall whole or intact cellular structure, or having an intact nuclear membrane, or having an intact plasma membrane, or having intact cellular components.

As used herein, the term "stroma" refers to one or more materials existing in the extracellular environment of a whole cell in a tissue.

As used herein, the terms "first" and "second" when modifying "portion" are an arbitrary naming convention and do not reflect the order of pipetting the extraction mixture.

As used herein, the term "isolated" refers to a whole cell that is not in contact with surrounding tissue.

As used herein, the term "pipette" refers to a fluid or solution handling device, and is interchangeable with the term "pipet". The term "pipette" can be used as a noun or verb, meaning to use a pipette, depending on how it is used herein.

Unless otherwise noted, the unit prefix "micro," commonly abbreviated "µ" can be represented herein by "u" when used in a unit of measurement. For example, "uM" can be interchangeably used with "µM" to mean micromolar.

Unless otherwise noted, the term "substantially" refers to an approximation. When referring to parallel surfaces or blades, "substantially" means within ±10 degrees of another parallel surface or blade. When referring to a surface that is straight or planar, then substantially can include an up to 10 degree radius of curvature or non-planarity.

Effective preparation of samples of living tissues, including cells and their components, is key to achieving accurate and meaningful results for biological research and medical endeavors. Freezing techniques have been used to preserve tissue and cell samples until they can be analyzed. Tissue samples are be frozen or fixed as quickly as possible after collection, to avoid structural distortions and damage due to drying, autolysis by enzymes, and microbial decomposition. Freezing living tissues usually kills the cells due to the formation of ice crystals that cause lethal damage to cellular components. Some freezing techniques are used to lyse and disrupt cells and organelles in order to isolate their components. Other freezing techniques using one or more cryoprotective agents (CPAs) can preserve cells for long periods of time in a viable state, or preserve subcellular constituents and the integrity of cell ultrastructure.

Primary cell culturing from freshly resected tissues or tumors can be employed when fresh samples are available. The growth of primary cell cultures may preserve cellular integrity, but presents challenges to maintaining cell viability, often resulting in low yields. Growth of cells in culture removes the cells from their native tissue environment, which may alter cellular characteristics, in turn affecting the results of subsequent analyses. Primary cell culturing is also very time consuming, requiring hours or days. Enzymatic digestion may also be required to disassociate cells from the tissues, which can result in damage to components present in cellular membranes. Perfusion by syringe or other such apparatus may also cause cellular damage. Studies using classical freeze/thaw techniques suggest that all analyses of living tumor cells should be conducted only using freshly dissociated tumors. However, fresh primary tumors are often not available, and patient treatment planning is limited to sites with nearby surgical rooms. Due to these limitations, tissue samples are often preserved for biomedical research or medical analysis either as formalin-fixed paraffin-embedded (FFPE) samples, or flash-frozen in liquid nitrogen. Therefore, improved protocols for using preserved or frozen tissues would allow analyses to be more effective and meaningful, and help to eliminate the constraints of close proximity of the biopsy source to the laboratory.

Frozen tissues without preservation are often used for tissue staining for histology or histopathology studies. Using conventional methods, cells from frozen tissues are considered useless or of extremely poor quality for other applications because cell structure is severely damaged beyond useful analysis. Frozen tissue lysis is used for biochemical analyses of cellular characteristics, but whole cells cannot be obtained for analysis. Samples from frozen and lysed tissues include a total lysate, including cellular components mixed with blood, vessels, and other stroma material. Homogenization or grinding of the tissues can also result in damage to cellular components.

It is believed that all conventional cryopreservation methods use at least one cryoprotective agent (CPA) to render water inside and outside the cells vitreous, or nano-crystallized near vitrification, in order to reduce the formation of ice crystals that damage cellular integrity. CPA cryopreservation is designed for cells as well as organoids, and can help to avoid tissue distortion and cell damage that occur with slow freezing. However, CPAs lead to inaccurate analysis due to their cytotoxicity and potential deleterious side effects on cellular structure and function. Preparation of frozen tissues using cryoprotective agents can also be time consuming, and some degradation of RNA can occur.

Methods of CPA-free cryopreservation of cells and tissues have been developed, including "flash" or "snap" freezing techniques. Unfortunately, mammalian cells cannot survive the low temperatures unless they are cryo-preserved with the treatment of special agents, such as DMSO or other non-native preservation media. However, if tissues are frozen rapidly enough, the water does not have time to form crystals but remains in a vitreous form that does not expand when solidified. Snap frozen cells die, but the deep freezing in −80 degrees C. or beyond prevents decomposition. The extraction of a cell from snap-frozen tissues is feasible if the technique allows for maintaining the cell structure without mixing nuclear and cytoplasmic components.

Studies of CPA-free cryopreservation of mammalian cells by ultra-rapid cooling, generation of induced pluripotent stem cells (iPSCs) from frozen, non-cryoprotected tissues, and 3D organoid growth from flash-frozen tumors indicate that the basic cell structure in such flash-frozen tissues and tumors remains intact. However, the examination of living cells dissociated from breast cancer patients has revealed that classical freeze/thaw protocols lead to a marked reduction of receptors in tumor cells. These cryopreservation-driven alterations in cellular phenotype make it impossible to compare fresh and frozen samples from the same patient directly. Moreover, the freeze/thaw process changes the transcriptomic signatures of cancer stem cells. The more time that passes between the thawing of the frozen tissues and subsequent analysis, the more opportunity there is for structural and functional changes to occur in the tissue cell population that can adversely affect the accuracy of subsequent biochemical analyses. This can be particularly true for frozen tissue samples that have not been treated with a cryoprotective agent. Techniques that would allow rapid isolation of whole cells from frozen tissues, upon thawing of the tissue samples, would be of great benefit to the accuracy and effectiveness of subsequent analyses of the structure and function of the cells isolated from the tissues.

The presence and variation of stroma in human tumors impedes the study of cancer in a native environment, which limits the use of tumor banks for cellular, molecular biology, and biochemical investigations. A challenge encountered by oncologists and life science investigators in studying malignant transformation and tumor growth is the authenticity of the tissue samples being analyzed. Tumors are comprised of nests of cancerous cells interspersed in a stroma that stains for fibrin. For instance, malignant epithelial tumors are composed of carcinoma cells, together with stromal fibroblasts, immune effector cells, microvasculature and the extracellular matrix (fat and fibers), which are collectively referred to as the tumor microenvironment. The tumor-stroma ratio can vary in different types of cancer from as much as 2% to 80%. The Tumor-Stroma Ratio is an independent predictor for overall survival and disease free survival in a number of different cancers including gastric cancers, squamous cell carcinoma, non-small cell lung cancer, cervical carcinoma, and esophageal squamous cell carcinoma. The dynamic interplay between cancer cells and stromal components within the tumor microenvironment contributes to malignant progression and metastasis. However, the presence and high variability of the stroma within tumors impedes the biochemical analysis of malignant cells. As an alternative, scientists study cancer by isolating tumor cells and growing them in cell cultures, which is not equivalent to the real tumor environment because it does not have a stromal microenvironment. Growing a primary tumor cell line is a time-consuming process and is not straightforward. The use of cell lines from the American Type Culture Collection (ATCC) bank is helpful for the investigation of cellular processes. However, established cell lines can be even more different than that of the primary cell culture extracted from freshly resected tumors. Therefore, primary or established cell lines cannot entirely reflect the specific tumor status within the body. There is a high demand for technology that helps to study malignant cell growth and other characteristics as they exist in a native environment. A technology that overcomes this challenge and allows scientists to isolate tumor cells from frozen tissues rapidly and efficiently would be very beneficial for cancer studies.

It has been discovered that whole cells, including mammalian cells, can be isolated from frozen tissue samples without the use of CPAs or DMSO. The methods and kits of the present disclosure can provide for the isolation of whole cells from frozen tissue samples, including whole cells from flash frozen tumors and normal tissues, without the destruction of cellular components. In various embodiments, a benefit of rapid isolation of whole cells from frozen tissues can be achieved by low-temperature processing and fast execution of the embodied methods, requiring minutes rather than hours or days, an important advantage over currently available tissue dissociation methods. Methods and kits embodied herein can provide a benefit of preserving cell structures, including the cytosol and nucleus, and allow the later fractionation of cells into the cytosol, perinuclear network, and the core nucleus for further biochemical analysis. Various embodiments can provide a benefit of extraction of whole cells directly from the surrounding stroma material, thus reducing an amount of stroma material in a whole cell sample, and providing a benefit of isolated whole cells that are suitable for subsequent biochemical analysis.

The isolation of whole or "intact" cells from frozen tissues according to embodiments herein, together with cell fractionation, can provide a benefit of a positive impact on cancer research. The structure and states of cellular components such as proteins, phosphorylated proteins, and nucleic acids can be preserved, so that the accuracy of subsequent biochemical analysis is improved. Isolated whole cells from frozen tissues can be applied to a more meaningful study of the proteins, nucleic acids, and other components of the malignant cells, and also for investigating the mechanisms of drug effects on cancer cells and other applications.

Methods of Isolating Whole Cells of Various Embodiments

Embodiments herein are directed to methods of isolating whole cells from a frozen tissue sample. As a general overview of a method disclosed herein, referring to FIG. 1, the method of isolating whole cells 100 includes providing a frozen tissue sample 102, wherein the frozen tissue sample contains whole cells and stroma material; cutting the frozen tissue sample into two or more tissue pieces 104 using a tissue sample cutter, wherein the tissue sample cutter has a plurality of cutting blades; forming an extraction mixture 106 by incubating the two or more tissue pieces in a volume of tissue sample solution (TSS) for an incubation period;

forming a whole cell sample 108 by pipetting a first portion of the extraction mixture from the tissue sample solution into an extraction pipette 110 and then pipetting a second portion of the extraction mixture from the extraction pipette into a supernatant 112; and collecting isolated whole cells 114 from the whole cell sample by flowing the extraction mixture through a separation funnel into a collection vessel. In an embodiment, provided that stroma material is present in the whole cell sample, the method includes reducing an amount of stroma material in the whole cell sample by flowing the extraction mixture through a separation funnel into a collection vessel 116. In an embodiment, the method includes forming a pellet of whole cells 118 by centrifuging the supernatant containing the collected isolated whole cells in the collection vessel; removing the supernatant from the collection vessel 120; forming a washed cell suspension 122 by suspending the pellet in a volume of cell wash solution (CWS); forming a washed cell pellet and a washed cell supernatant 124 by centrifuging the washed cell suspension; and forming a sample of isolated whole cells 126 by removing the washed cell supernatant from the washed cell pellet.

In some embodiments, the frozen tissue sample includes a normal tissue sample, or the whole cells include normal cells. In other embodiments, the tissue sample includes a tumor sample, or the whole cells include tumor cells. In some embodiments, the tissue sample includes a combination of normal and tumor tissues, or the whole cells include a combination of normal and tumor cells. In various embodiments, "whole cells" includes one or more whole cell types including, but not limited to, epithelial cells, fibroblasts, malignant cells, benign cells, organ cells, and combinations thereof. In various embodiments, the frozen tissue sample contains whole cells and stroma material. In various embodiments, the stroma material includes one or more materials existing in the extracellular environment of a tissue, including but not limited to blood, blood vessels, connective tissue, extracellular matrix materials, nervous tissue, ductal tissue, parenchymal tissue, and combinations thereof. In some embodiments, the cells can be mammalian cells, including human cells, human cancer cells, dog cells, horse cells, mouse cells, rat cells, rabbit cells, guinea pig cells, hamster cells, bird cells, fish cells, non-human primate cells, cat cells, cow cells, or cancer cells thereof.

In various embodiments, a method of isolating whole cells from a frozen tissue sample includes cutting the frozen tissue sample into two or more tissue pieces. In certain embodiments, the tissue sample has a weight of from about 1 gram to about 5 grams. In certain embodiments, the tissue sample has a weight of from about 2 gram to about 4 grams. In certain embodiments, the tissue sample has a weight of from about 0.1 gram to about 1 gram; in other embodiments, the tissue sample has a weight of from about 5 grams to about 20 grams. In such embodiments, the number of cells present in the tissue sample can determine a weight of the tissue sample required for subsequent analysis; for example, some tumors contain as low as 2% stroma material and relatively large numbers of cells, while other tumors contain up to 80% of stroma material, and relatively few cells. In certain embodiments, the two or more tissue pieces have a width of from about 2 mm to about 6 mm. In certain embodiments, the two or more tissue pieces have a width of from about 3 mm to about 5 mm. In various embodiments, the two or more tissue pieces are cut to a width suitable for forming an extraction mixture, and forming a whole cell sample by pipetting.

In certain embodiments, the method includes maintaining the frozen tissue at a temperature below 0 degrees Celsius before and during cutting. In certain embodiments, the method includes maintaining the frozen tissue at a temperature of about 0 degrees Celsius to about 4 degrees Celsius before and during cutting. In certain embodiments, the method includes maintaining the frozen tissue at a temperature of about 1 degrees Celsius to about 3 degrees Celsius before and during cutting. In certain embodiments, the frozen tissue is maintained at a suitable temperature by placing the frozen tissue in a suitable container on ice, or in a cold room. In various embodiments, a temperature above about 4 degrees Celsius may result in melting of the frozen tissue, which would not be suitable for extraction of the whole cells from the tissues, because the whole cells need to be hydrated with the TSS solution upon melting. In certain embodiments, the method includes maintaining the frozen tissue at a temperature of from about −20 degrees Celsius to about 0 degrees Celsius before and during cutting. In various embodiments, the temperature of the frozen tissue can be maintained by keeping the tissue samples on dry ice. In some embodiments, after cutting, the tissue pieces are placed in TSS at a temperature that is from about 0 degrees Celsius to about 4 degrees Celsius; in such embodiments, the frozen tissue pieces that are maintained at a temperature as low as about −20 degrees Celsius, provided the tissue pieces are a suitable weight and width, will not freeze the TSS liquid, and the temperature between the frozen tissue samples and the TSS can be equilibrated rapidly. In various embodiments, a temperature lower than about −20 degrees Celsius may result in freezing of the TSS by the frozen tissue pieces, which would not allow rapid temperature equilibration between the frozen tissue pieces and the TSS.

In various embodiments, the frozen tissue sample is cut into two or more tissue pieces using a tissue sample cutter, wherein the tissue sample cutter has a plurality of cutting blades. The plurality of cutting blades in various embodiments can provide benefits of rapid and efficient cutting of the frozen tissue sample into two or more tissue pieces of a width suitable for forming an extraction mixture, and reducing the time required between removing the frozen tissue from frozen storage and placing the cut tissue pieces into a volume of tissue sample solution (TSS) in forming an extraction mixture according to embodied methods. The rapid and efficient cutting of the frozen tissue sample can provide a benefit of the tissue sample remaining in the frozen state after removal of the tissue sample from frozen storage and during cutting, helping to preserve the integrity of the whole cells in the frozen tissue sample. In various embodiments, the frozen tissue sample can be placed on a suitable surface for cutting the tissue sample with the tissue sample cutter. In some embodiments, such a surface can include a plastic surface, or a surface of a petri dish. In such embodiments, a petri dish can include a 60 mm or a 100 mm diameter plastic petri dish.

In various embodiments, a method of isolating whole cells from a frozen tissue sample includes forming an extraction mixture by incubating the two or more tissue pieces in a volume of tissue sample solutions (TSS) for an incubation period. In an embodiment, the incubation period is from about 3 minutes to about 5 minutes. In an embodiment, the incubation period is from about 3.5 minutes to about 4.5 minutes. In another embodiment, incubating the tissue pieces includes shaking the extraction mixture during a portion of the incubation period. In some embodiments, the incubation period is performed at a temperature of from about 0 degrees Celsius to about 4 degrees Celsius. In an embodiment, the incubation period is performed at a temperature of from about 1 degrees Celsius to about 3 degrees Celsius. In certain embodiments, the incubation can be performed at a suitable temperature by placing the two or more tissue pieces in a volume of tissue sample solution (TSS) in a suitable container on ice, or in a cold room. In an embodiment, a suitable container can include a test tube or a plastic sample tube.

In various embodiments, the tissue sample solution (TSS) includes from about 10 mM to about 40 mM Hepes, from about 0 mM to about 120 mM KCl, from 0 mM to about 150 mM NaCl, from 0 mM to about 10 mM $MgCl_2$, from 0 µM to about 2 µM $CaCl_2$, and from 0% to about 10% glycerol. In an embodiment, the TSS includes from about 15 mM to about 35 mM Hepes. In an embodiment, the TSS includes from about 20 mM to about 30 mM Hepes. In an embodiment, the TSS includes from about 30 mM to about 90 mM KCl. In an embodiment, the TSS includes from about 50 mM to about 70 mM KCl. In an embodiment, the TSS includes from about 30 mM to about 120 mM NaCl. In an embodiment, the TSS includes from about 60 mM to about 90 mM NaCl. In an embodiment, the TSS includes from about 2 mM to about 8 mM $MgCl_2$. In an embodiment, the TSS includes from about 4 mM to about 6 mM $MgCl_2$. In an embodiment, the TSS includes from about 0.5 µM to about 1.5 µM $CaCl_2$. In an embodiment, the TSS includes from about 2% to about 8% glycerol. In an embodiment, the TSS includes from about 4% to about 6% glycerol.

In certain embodiments, the TSS includes KCl, potassium acetate ($CH_3CO_2K$), or a combination thereof, as a source of potassium ion ($K+$).

In certain embodiments, the TSS includes a buffer that is capable of maintaining the TSS at a pH of from about 7.0 to about 7.5. In certain embodiments, such a buffer includes a Tris-HCl {tris(hydroxymethyl)aminomethane)} buffer, a Tricine buffer, a Citric acid-Na2HPO4Na2HPO4-NaH2PO4 buffer, a KH2PO4-NaOH buffer, an Imidazole-HCl buffer, a MOPS (3-(N-morpholino)propanesulfonic acid) buffer, or a combination thereof; or another suitable buffer.

In an embodiment, the TSS excludes a cryoprotective agent (CPA). In an embodiment, the TSS excludes dimethylsulfoxide (DMSO), sucrose, trehalose, lactose, and maltose. In an embodiment, the TSS excludes DMSO. In an embodiment, the TSS includes sucrose, trehalose, lactose, maltose, glucose, or a combination thereof. In an embodiment, the TSS includes glucose at a concentration of about 10% by weight or less. The TSS solution of various embodiments can provide a benefit of helping to maintain whole cells in the frozen tissue sample in a whole, or intact, state during the incubation period.

In an embodiment of the methods herein, the method includes forming a whole cell sample by pipetting a first portion of the extraction mixture from the tissue sample solution into an extraction pipette, and then pipetting a second portion of the extraction mixture from the extraction pipette into a supernatant. In an embodiment, the pipetting is performed for a pipetting period of from about 1 minute to about 15 minutes. In an embodiment, the pipetting is performed for a pipetting period of from about 3 minutes to about 10 minutes. In an embodiment, the pipetting is performed for a pipetting period of from about 5 minutes to about 7 minutes. Pipetting the first portion and the second portion can in various embodiments include inserting the extraction pipette into the extraction mixture during the pipetting period. In various embodiments, pipetting the first portion of the extraction mixture into the extraction pipette can result in a mechanical dissociation of whole cells from the one or more tissue pieces; pipetting the second portion from the extraction pipette into a supernatant can result in dissociated whole cells suspended in the supernatant. In certain embodiments, the pipetting of the first and second portions is repeated a number of times during the pipetting period. In certain embodiments, the method can include visually monitoring the turbidity of the supernatant during the pipetting to indicate that whole cells are being dissociated from the two or more tissue pieces. In such embodiments, the pipetting period can be adjusted according to the turbidity of the supernatant, as a criterion for obtaining a sufficient number of isolated whole cells for subsequent analyses. In various embodiments, pipetting during the pipetting period can provide a benefit of rapid dissociation of whole cells from the two or more tissue pieces, while maintaining the cells in a whole cell state during forming a whole cell sample. Such embodiments can also provide a benefit of forming a whole cell sample without the use of enzymatic digestion of the tissue sample.

Embodiments of methods herein include collecting isolated whole cells from the whole cell sample by flowing the extraction mixture through a separation funnel into a collection vessel. In various embodiments, a collection vessel can include any suitable container for collection of the whole cell sample, including but not limited to a test tube or a plastic sample tube. Such a collection vessel may be of suitable dimensions for collection of the whole sample after flowing the extraction mixture through a separation funnel. In an embodiment, the collection vessel can include a tube having an inner diameter of from about 8 mm to about 15 mm and a length of from about 40 mm to about 150 mm. In an embodiment, the collection vessel can include an Eppendorf tube having an inner diameter of about 8 mm and a length of about 40 mm.

In certain embodiments of a method herein, flowing the extraction mixture through a separation funnel into a collection vessel can include flowing an initial volume of extraction mixture through a separation funnel by decanting, and transferring a residual volume of extraction mixture into the separation funnel using a micropipette attached to a pipette tip of a suitable size for transferring the residual volume. Such embodiments can include using a 1 ml plastic pipette tip, or a 0.2 ml plastic pipette tip, or a combination thereof. In other embodiments, after flowing the extraction mixture through a separation funnel, the method can include washing the tissue pieces with an additional wash volume of TSS, and transferring the additional wash volume of TSS containing any residual whole cells into the separation funnel. In certain embodiments, the wash volume of TSS can be from about 0.2 ml to about 1 ml, depending on the weight and width of the tissue pieces. Such embodiments can provide a benefit of removing small residual volumes of supernatant containing whole cells.

Provided that stroma material is present in the whole cell sample, the method in such embodiments includes reducing an amount of stroma material in the whole cell sample by flowing the extraction mixture through a separation funnel into a collection vessel. Such embodiments can provide a benefit of rapid isolation of whole cells from the whole cell sample when the extraction mixture is flowed through a separation funnel, thereby collecting the whole cells in a collection vessel. In such embodiments, large pieces of stroma, including any heavy solid material, can be retained in the vessel containing the extraction mixture as the remainder of the extraction mixture, including the supernatant with whole cells, is flowed through a separation funnel. In such embodiments, additional stroma material can be retained on an inner surface of the separation funnel. In another embodiment, the method includes further reducing an amount of stroma material in the whole cell sample by flowing the supernatant from the collection vessel through the separation funnel, or through a second separation funnel into a second collection vessel. Such embodiments can further reduce an amount of stroma material in the whole cell sample. Such embodiments can provide a benefit of rapid and efficient reduction of stroma material from the whole cell sample, resulting in isolated whole cells in the collection vessel with a reduced amount of stroma material. Such embodiments can provide benefits of isolating a whole cell sample without destruction of the cells, and providing a whole cell sample that is more likely to retain cellular structures and functions that are present in the cells as they exist within the tissues.

In certain embodied methods, a method of isolating whole cells from a frozen tissue sample includes forming a pellet of whole cells by centrifuging the supernatant in the collection vessel and removing the supernatant from the collection vessel. In various embodiments, the supernatant can be removed by decanting or by aspiration. In certain embodiments, the method includes forming a washed cell suspension by suspending the pellet in a volume of cell wash solution (CWS), forming a washed cell pellet and a washed cell supernatant by centrifuging the washed cell suspension; and forming a sample of isolated whole cells by removing the washed cell supernatant from the washed cell pellet. In certain embodiments, the centrifuging is performed at a gravitational force of from about 80 g to about 120 g. In certain embodiments, the centrifuging is performed at a gravitational force of from about 90 g to about 110 g. In certain embodiments, the centrifuging is performed at a gravitational force of from about 95 g to about 105 g. In certain embodiments, the centrifuging is performed for a centrifuge period of from about 3 minutes to about 7 minutes. In certain embodiments, the centrifuging is performed for a centrifuge period of from about 4 minutes to about 6 minutes. Such embodiments can provide benefits of further isolating the whole cells from any remaining stroma material in the whole cell sample, and helping to prepare the whole cell sample for any subsequent analysis.

In various embodiments, the cell wash solution (CWS) includes from about 10 mM to about 40 mM Hepes, from 0 mM to about 120 mM KCl, from 0 mM to about 150 mM NaCl, from 0 mM to about 10 mM $MgCl_2$, from 0 μM to about 2 μM $CaCl_2$, and from 0% to about 10% glycerol. In an embodiment, the CWS includes from about 15 mM to about 35 mM Hepes. In an embodiment, the CWS includes from about 20 mM to about 30 mM Hepes. In an embodiment, the CWS includes from about 30 mM to about 90 mM KCl. In an embodiment, the CWS includes from about 50 mM to about 70 mM KCl. In an embodiment, the CWS includes from about 30 mM to about 120 mM NaCl. In an embodiment, the CWS includes from about 60 mM to about 90 mM NaCl. In an embodiment, the CWS includes from about 2 mM to about 8 mM $MgCl_2$. In an embodiment, the CWS includes from about 4 mM to about 6 mM $MgCl_2$. In an embodiment, the CWS includes from about 0.5 μM to about 1.5 μM CaCl2. In an embodiment, the CWS includes from about 2% to about 8% glycerol. In an embodiment, the CWS includes from about 4% to about 6% glycerol.

In certain embodiments, the CWS includes KCl, potassium acetate ($CH_3CO_2K$), or a combination thereof, as a source of potassium ion (K+).

In certain embodiments, the CWS includes a buffer that is capable of maintaining the CWS at a pH of from about 7.0 to about 7.5. In certain embodiments, such a buffer includes a Tris-HCl {tris(hydroxymethyl)aminomethane)} buffer, a Tricine buffer, a Citric acid-Na2HPO4Na2HPO4-NaH2PO4 buffer, a KH2PO4-NaOH buffer, an Imidazole-HCl buffer, a MOPS (3-(N-morpholino)propanesulfonic acid) buffer, or a combination thereof; or another suitable buffer.

In an embodiment, the CWS excludes a cryoprotective agent (CPA). In an embodiment, the CWS excludes dimethylsulfoxide (DMSO), sucrose, trehalose, lactose, and maltose. In an embodiment, the CWS excludes DMSO. In an embodiment, the CWS includes sucrose, trehalose, lactose, maltose, glucose, or a combination thereof. In an embodiment, the CWS includes glucose at a concentration of about 10% by weight or less. The CWS solution of various embodiments can provide a benefit of helping to maintain whole cells in the frozen tissue sample in a whole, or intact, state during forming a washed cell pellet.

In certain embodiments, the methods herein include performing at least one biochemical analysis on the isolated whole cells. In certain embodiments, the at least one biochemical analysis includes protein analysis, phosphorylated protein analysis, nucleic acid analysis, or a combination thereof. In such embodiments, the TSS can include at least one protease inhibitor, at least one phosphatase inhibitor, at least one DNase inhibitor, at least one RNase inhibitor, or a combination thereof, as suitable according to the type or types of biochemical analysis to be carried out on the isolated whole cells.

Kits of Various Embodiments

Kits for obtaining whole cells from a frozen tissue sample are disclosed herein. In various embodiments, a kit includes a tissue sample cutter having a plurality of cutting blades; at least one extraction pipette, at least one separation funnel, at least one vessel containing a volume of tissue sample solution (TSS), and at least one vessel containing a volume of cell washing solution (CWS). In an embodiment, the kit further includes at least one collection vessel. The kits of various embodiments can provide a benefit of facilitating the practice of embodiments of the methods disclosed herein.

Tissue Sample Cutters of Various Embodiments

Various embodiments herein disclose a tissue sample cutter. In various embodiments, the tissue sample cutter has a plurality of cutting blades. In some embodiments, the tissue sample cutter includes a handle having the plurality of cutting blades attached thereto. In certain embodiments, the plurality of cutting blades extend in a substantially parallel direction from the handle. In certain embodiments, the plurality of blades has a plurality of cutting edges located a distance of from about 1 cm to about 2 cm distance from the handle.

In certain embodiments, the plurality of cutting blades includes from 2 to 8 cutting blades. In certain embodiments, the plurality of cutting blades includes razor blades having a length of from about 3 cm to about 5 cm. In certain embodiments, the plurality of razor blades has a length of from about 3.5 cm to about 4.5 cm. In certain embodiments, the razor blades have a height of from about 1 cm to about 2 cm. In certain embodiments, the cutting blades include a spacing of from about 2 mm to about 6 mm between the cutting edges. In certain embodiments, the cutting blades include a spacing of from about 3 mm to about 5 mm between the cutting edges. In certain embodiments, the cutting blades include a spacing of from about 3.5 mm to about 4.5 mm between the cutting edges.

The various embodiments of a tissue sample cutter herein can provide benefits of rapid and efficient cutting of the frozen tissue sample into two or more tissue pieces of a width suitable for forming an extraction mixture according to the methods embodied herein, and reducing the time required between removing the frozen tissue from frozen storage and placing the cut tissue pieces into a volume of tissue sample solution (TSS) in forming an extraction mixture according to embodied methods. Embodiments of a tissue sample cutter can provide a benefit of allowing multiple cuts to be made to the frozen tissue sample with a single cutting action, including one or more repeated cutting actions at desired angles to most rapidly and efficiently cut the frozen tissue sample into two or more tissue pieces of a suitable width. The rapid and efficient cutting of the frozen tissue sample can provide a benefit of the tissue sample remaining in the frozen state after removal of the tissue sample from frozen storage and during cutting, helping to preserve the integrity of the whole cells in the frozen tissue sample.

Extraction Pipettes of Various Embodiments

Figure 2:
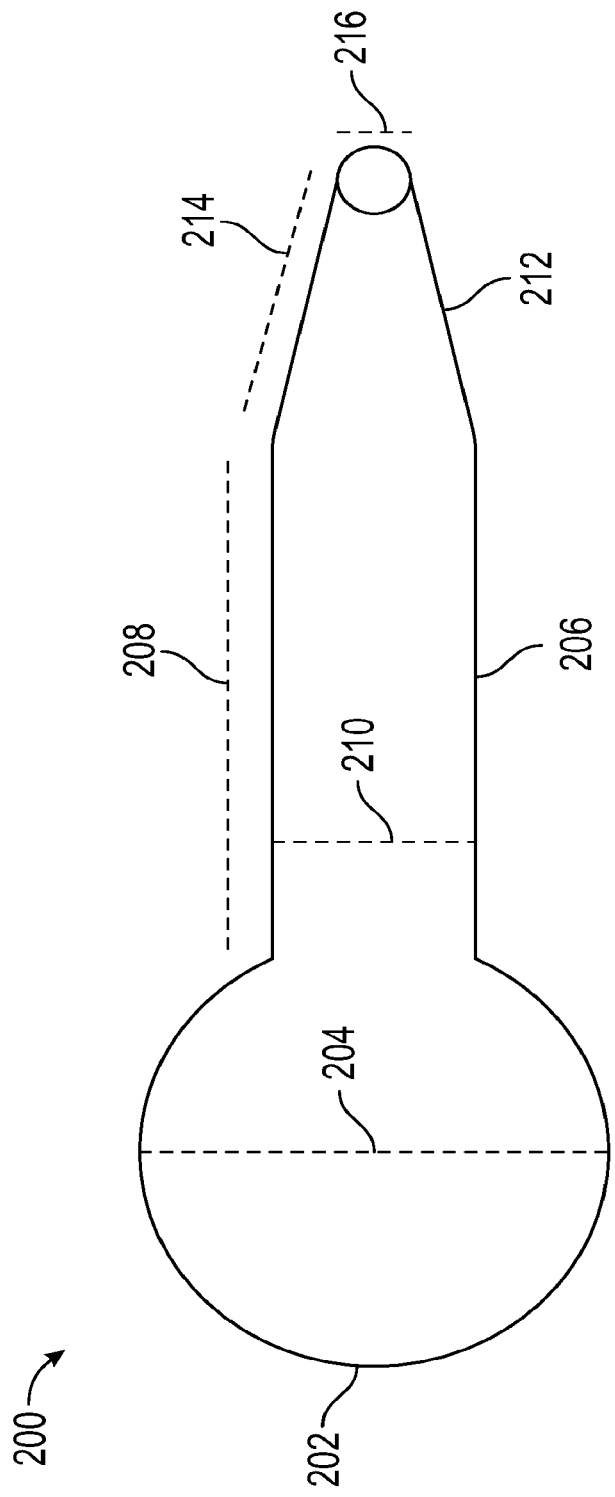
FIG. 2 is a schematic illustration of an extraction pipette according to embodiments disclosed herein.

Various embodiments herein disclose an extraction pipette. In an embodiment of an extraction pipette, referring to FIG. 2, extraction pipette 200 includes a bulb portion 202 having a maximum internal diameter 204, and a fluid transport portion 206 having a substantially straight portion 208, a maximum bore diameter 210, and a tapered portion 212 having a length 214 and a minimum internal diameter 216.

In an embodiment, the at least one extraction pipette includes a bulb portion and a fluid transport portion. In certain embodiments, the bulb portion has a maximum internal diameter of from about 15 mm to about 25 mm. In certain embodiments, the bulb portion has a maximum internal diameter of from about 18 mm to about 22 mm. In certain embodiments, the fluid transport portion includes a substantially straight portion having a length of from about 50 mm to about 90 mm. In certain embodiments, the substantially straight portion has a length of from about 60 mm to about 80 mm. In certain embodiments, the substantially straight portion has a length of from about 65 mm to about 75 mm. In certain embodiments, the fluid transport portion includes a tapered portion having a length of from about 5 mm to about 15 mm. In certain embodiments, the tapered portion has a length of from about 7 mm to about 13 mm. In certain embodiments, the tapered portion has a length of from about 9 mm to about 11 mm. In certain embodiments, the tapered portion has a minimum internal diameter of from about 5 mm to about 10 mm. In certain embodiments, the tapered portion has a minimum internal diameter of from about 7 mm to about 9 mm. In certain embodiments, the at least one extraction pipette includes a transfer pipette formed of a flexible plastic material. Such a flexible plastic material can include a low-density polyethylene (LDPE) plastic material. In certain embodiments, the at least one extraction pipette can include a volumetric micropipette connected to a pipette tip of a suitable volume and bore size for performing the pipetting an extraction mixture according to methods embodied herein. In certain embodiments, such a pipette tip can include a 1 ml plastic pipette tip, or a 0.2 ml plastic pipette tip; in such embodiments, a suitable bore size may be obtained as necessary by, for example, trimming an end of the plastic pipette tip.

Various embodiments of an extraction pipette herein can provide benefits of permitting suitable volume portions of an extraction mixture according to embodied methods to be pipetted through a minimum internal diameter of the pipette, to enable the rapid dissociation of whole cells from the two or more tissue pieces while maintaining the cells in a whole cell state during forming a whole cell sample. Such embodiments can also provide a benefit of forming a whole cell sample without the use of enzymatic digestion of the tissue sample.

Separation Funnels of Various Embodiments

Figure 3:
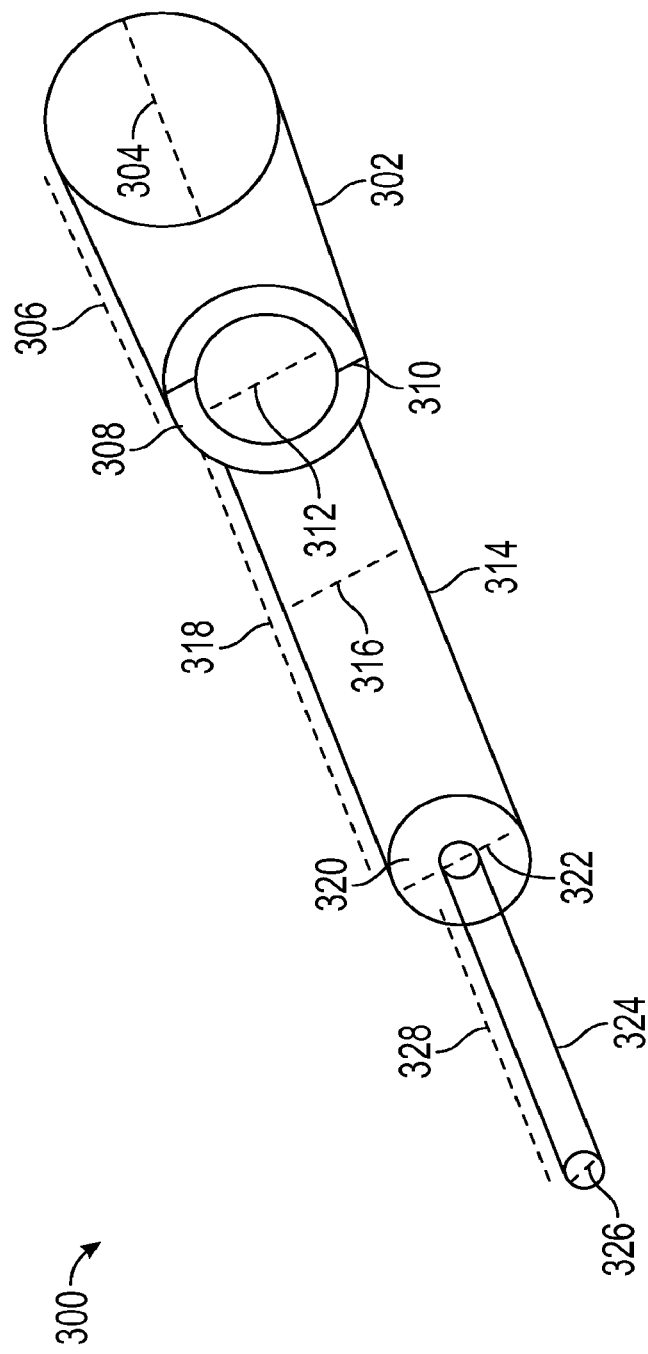
FIG. 3 is a schematic illustration of a separation funnel according to embodiments disclosed herein.

Various embodiments herein disclose a separation funnel. In an embodiment of a separation funnel, referring to FIG. 3, separation funnel 300 includes a first funnel portion 302 having a maximum internal diameter 304, a first funnel length 306, and a first taper joint 308 connected to an end thereof, the first taper joint having a maximum internal diameter 310 and forming a minimum internal diameter 312 of the first funnel portion; a second funnel portion 314 connected to the first taper joint and having a maximum internal diameter 316, a second funnel length 318, and a second taper joint 320 connected to an end thereof, the second taper joint having an internal diameter 322; and a third funnel portion 324 connected to the second taper joint, having an internal diameter 326 and a third funnel length 328.

In an embodiment, the at least one separation funnel includes a first funnel portion having a maximum internal diameter of from about 8 mm to about 22 mm. In certain embodiments, the first funnel portion has a maximum internal diameter of from about 11 mm to about 19 mm. first funnel portion having a maximum internal diameter of from about 13 mm to about 15 mm. In certain embodiments, the first funnel portion has a first funnel length of from about 8 mm to about 12 mm. In certain embodiments, the first funnel length is from about 9 mm to about 11 mm. In certain embodiments, the first funnel portion includes a first taper joint connected to an end thereof. In certain embodiments, the first taper joint has a maximum internal diameter of from about 2 mm to about 6 mm. In certain embodiments, the first taper joint has a maximum internal diameter of from about 3 mm to about 5 mm. In certain embodiments, the first taper joint forms a minimum internal diameter of the first funnel portion of from about 10 mm to about 12 mm. In certain embodiments, the at least one separation funnel includes a second funnel portion connected to the first taper joint and having a maximum internal diameter of from about 10 mm to about 12 mm. In certain embodiment, the second funnel portion has a second funnel length of from about 50 mm to about 70 mm. In certain embodiments, the second funnel length is from about 55 mm to about 65 mm. In certain embodiments, the second funnel portion includes a second taper joint connected to an end thereof, the second taper joint having an internal diameter of from about 3 mm to about 5 mm. In certain embodiments, the at least one separation funnel includes a third funnel portion connected to the second taper joint and having an internal diameter of from about 3 mm to about 5 mm. In certain embodiments, the third funnel portion has a third funnel length of from about 25 mm to about 35 mm. In certain embodiments, the third funnel length is from about 28 mm to about 32 mm. In certain embodiments, the first taper joint and the second taper joint have a taper angle relative to the first funnel portion or the second funnel portion of from about 10 degrees to about 45 degrees. In various embodiments, the taper angle can be variable, because there may be a tilting of the funnel relative to the collection tube during decanting for cell collection. In some embodiments including decanting the extraction mixture by hand, the tilt angle is not exact because when one slurs a liquid by hand, one does not measure the tilting degree as long as the liquid pours by gravitation to the collection tube. In certain embodiments, the separation funnel is formed of a single piece of a plastic material. Such a plastic material can include a high density polyethylene or a virgin polyethylene material.

Embodiments of a separation funnel herein can provide a benefit of rapid isolation of whole cells from the whole cell sample when the extraction mixture is flowed through a separation funnel according to embodied methods herein, thereby collecting the whole cells in a collection vessel. In such embodiments, large pieces of stroma, including any heavy solid material, can be retained in the vessel containing the extraction mixture as the remainder of the extraction mixture, including the supernatant with whole cells, is flowed through a separation funnel. In such embodiments, additional stroma material can be retained on an inner surface of the separation funnel. Embodiments wherein the first taper joint and the second taper joints have a taper angle relative to the first funnel portion or second funnel portion can provide a benefit of retaining stroma material on the inner diameter surface of the angled taper joints. Such embodiments can further reduce an amount of stroma material in the whole cell sample. Such embodiments can provide a benefit of rapid and efficient reduction of stroma material from the whole cell sample, resulting in isolated whole cells in the collection vessel with a reduced amount of stroma material. Such embodiments can provide benefits of isolating a whole cell sample without destruction of the cells, and providing a whole cell sample that is more likely to retain cellular structures and functions that are present in the cells as they exist within the tissues.

Embodiments of kits herein include at least one vessel containing a volume of tissue sample solutions (TSS). In various embodiments, the tissue sample solution (TSS) includes from about 10 mM to about 40 mM Hepes, from about 0 mM to about 120 mM KCl, from 0 mM to about 150 mM NaCl, from 0 mM to about 10 mM $MgCl_2$, from 0 μM to about 2 μM $CaCl_2$, and from 0% to about 10% glycerol. In an embodiment, the TSS includes from about 15 mM to about 35 mM Hepes. In an embodiment, the TSS includes from about 20 mM to about 30 mM Hepes. In an embodiment, the TSS includes from about 30 mM to about 90 mM KCl. In an embodiment, the TSS includes from about 50 mM to about 70 mM KCl. In an embodiment, the TSS includes from about 30 mM to about 120 mM NaCl. In an embodiment, the TSS includes from about 60 mM to about 90 mM NaCl. In an embodiment, the TSS includes from about 2 mM to about 8 mM $MgCl_2$. In an embodiment, the TSS includes from about 4 mM to about 6 mM $MgCl_2$. In an embodiment, the TSS includes from about 0.5 μM to about 1.5 μM $CaCl_2$. In an embodiment, the TSS includes from about 2% to about 8% glycerol. In an embodiment, the TSS includes from about 4% to about 6% glycerol.

In certain embodiments, the TSS includes KCl, potassium acetate ($CH_3CO_2K$), or a combination thereof, as a source of potassium ion (K+).

In certain embodiments, the TSS includes a buffer that is capable of maintaining the TSS at a pH of from about 7.0 to about 7.5. In certain embodiments, such a buffer includes a Tris-HCl {tris(hydroxymethyl)aminomethane)} buffer, a Tricine buffer, a Citric acid-Na2HPO4Na2HPO4-NaH2PO4 buffer, a KH2PO4-NaOH buffer, an Imidazole-HCl buffer, a MOPS (3-(N-morpholino)propanesulfonic acid) buffer, or a combination thereof; or another suitable buffer.

In an embodiment, the TSS excludes a cryoprotective agent (CPA). In an embodiment, the TSS excludes dimethylsulfoxide (DMSO). In an embodiment, the TSS excludes DMSO, sucrose, trehalose, lactose, and maltose. In an embodiment, the TSS includes sucrose, trehalose, lactose, maltose, glucose, or a combination thereof. In an embodiment, the TSS includes glucose at a concentration of about 10% by weight or less. The TSS solution of various embodiments can provide a benefit of helping to maintain whole cells in the frozen tissue sample in a whole, or intact, state during the incubation period.

Embodiments of kits herein include at least one vessel containing a volume of cell wash solution (CWS). In various embodiments, the cell wash solution (CWS) includes from about 10 mM to about 40 mM Hepes, from 0 mM to about 120 mM KCl, from 0 mM to about 150 mM NaCl, from 0 mM to about 10 mM $MgCl_2$, from 0 μM to about 2 μM $CaCl_2$, and from 0% to about 10% glycerol. In an embodiment, the CWS includes from about 15 mM to about 35 mM Hepes. In an embodiment, the CWS includes from about 20 mM to about 30 mM Hepes. In an embodiment, the CWS includes from about 30 mM to about 90 mM KCl. In an embodiment, the CWS includes from about 50 mM to about 70 mM KCl. In an embodiment, the CWS includes from about 30 mM to about 120 mM NaCl. In an embodiment, the CWS includes from about 60 mM to about 90 mM NaCl. In an embodiment, the CWS includes from about 2 mM to about 8 mM $MgCl_2$. In an embodiment, the CWS includes from about 4 mM to about 6 mM $MgCl_2$. In an embodiment, the CWS includes from about 0.5 μM to about 1.5 μM $CaCl_2$. In an embodiment, the CWS includes from about 2% to about 8% glycerol. In an embodiment, the CWS includes from about 4% to about 6% glycerol.

In certain embodiments, the CWS includes KCl, potassium acetate ($CH_3CO_2K$), or a combination thereof, as a source of potassium ion (K+).

In certain embodiments, the CWS includes a buffer that is capable of maintaining the CWS at a pH of from about 7.0 to about 7.5. In certain embodiments, such a buffer includes a Tris-HCl {tris(hydroxymethyl)aminomethane)} buffer, a Tricine buffer, a Citric acid-Na2HPO4Na2HPO4-NaH2PO4 buffer, a KH2PO4-NaOH buffer, an Imidazole-HCl buffer, a MOPS (3-(N-morpholino)propanesulfonic acid) buffer, or a combination thereof; or another suitable buffer.

In an embodiment, the CWS excludes a cryoprotective agent (CPA). In an embodiment, the CWS excludes dimethylsulfoxide (DMSO). In an embodiment, the CWS excludes DMSO, sucrose, trehalose, lactose, and maltose. In an embodiment, the CWS includes sucrose, trehalose, lactose, maltose, glucose, or a combination thereof. In an embodiment, the CWS includes glucose at a concentration of about 10% by weight or less. The CWS solution of various embodiments can provide a benefit of helping to maintain whole cells in the frozen tissue sample in a whole, or intact, state during forming a washed cell pellet.

In certain embodiments of kits herein, the TSS includes at least one protease inhibitor, at least one phosphatase inhibitor, at least one DNase inhibitor, at least one RNase inhibitor, or a combination thereof. Such an inhibitor in certain embodiments can include one or more commercially available protease inhibitors, phosphatase inhibitor, DNase inhibitor, or RNase inhibitor. Such embodiments can provide a benefit of facilitating the performance at least one biochemical analysis on the isolated whole cells according to certain embodiments of methods herein.

EXAMPLES

Example 1

Freezing and Storage of Tumor Samples

A straightforward method is immersing the sample in liquid nitrogen or dry ice (−70° C.) with further storage in a –80° C. freezer. Freshly harvested tissue is wrapped in aluminum foil or placed in a plastic tube, then the foil envelope or plastic tube is directly placed in a container filled with dry ice pellets. This method has the advantages of simplicity and safety. Alternatively, the tissue is stored directly in a –80° C. freezer, or immersed in liquid nitrogen. These methods have the advantage of very rapid freezing. Tightly wrapped foil envelopes and screw-top plastic centrifuge tubes are commonly used for storage. For best results frozen tissues should be used for cell extraction as soon as possible.

Example 2

Preparation of Tumor Tissues for Cell Extraction

A. Samples, Instruments, and Reagents:
1. 1-5 g of tumor samples
2. TSS buffer and CWS buffer (provided)
3. Precision balances
4. Bucket with ice
5. 60 mm petri dish
6. 10 ml tube (provided)
7. 15 ml centrifugal tube
8. Multi blade cutter (provided)
9. Plastic pipette (provided)
10. Funnel (provided)
11. P1000 tips
12. Benchtop centrifuge with swing-out rotor (Model Sorvall ST 16, Thermo Scientific, MA)

B. Composition of Cell Extraction Kits

A cell extraction kit contains corresponding ingredients that can preserve the intact structure of the cells, as shown by H&E staining.

Kits were developed for the extraction of whole cells from healthy frozen tissues and frozen malignant tumors for further biochemical analysis.

Kits included 4× concentrated solutions of TSS and CWS that need to be diluted with RNase and DNase free high purity water and kept on ice prior to use. TSS included 60 mM Hepes, 0.4M KCl, 20 mM NaCl, 8 mM $MgCl_2$, 2 µM $CaCl_2$, and 4% glycerol. CWS included 60 mM Hepes, 0.4M KCl, 20 mM NaCl, 8 mM $MgCl_2$, 2 µM CaCl2, and 4% glycerol.

The kits permit a biochemical analysis of proteins, phosphorylation states of proteins, and nucleic acids. Depending on the purpose, cells will be isolated using a corresponding kit.
1. Kit variation #1 is suitable for the general protein analysis (PAAGE, WB, mass-spec and others). The TSS includes protease inhibitors.
2. Kit variation #2 is suitable for the phosphorylated protein analysis. The TSS includes protease inhibitors and phosphatase inhibitors.
3. Kit variation #3 is used for the molecular biology and nucleic acid analysis. The TSS includes RNase and DNase inhibitors.

Example 3

General Whole Cell Isolation Procedure

All the procedures were performed on ice or in a cold room at the 4° C. unless otherwise stated.

Samples containing 1-5 g of frozen tissue (normal or malignant) were cut into several large pieces with the sharp multi-blade cutter. Samples need to be cut before melting, which requires cutting quickly after removing the samples from dry ice. Because cutting with the single blade or scissors will be time-consuming, using the multi-blade cutter is much more effective and provides a more reliable result. Pieces of tissue were then transferred to a 10 ml tube with two volumes of diluted TSS solution. The sample pieces were incubated on a shaker for an incubation time of 3-5 min, under cold conditions or on ice for rehydration. Cells then were pipetted with the soft plastic extraction pipette. The specially designed pipette mechanically extracts cells from the tumor stroma without enzymatic digestion. The cell extraction with the mechanical pressure of the tumor tissue can be monitored by the supernatant turbidity that occurs within 3-5 minutes. Collection of cells from the supernatant was performed using a specially designed separation funnel. Cells floating in the supernatant were poured through the funnel into a 10 ml tube, without the stromal material. Non-digested tissue remained at the bottom of the 10 ml tube that was discarded. If the stromal material is poured with the supernatant, which can be observed as large pieces, the procedure can be repeated into a new 15 ml centrifuge tube. Cells were pelleted by centrifugation at 100×g for 5 min. The supernatant was discarded, and the cell pellet was washed with CWS (cell wash solution) and pelleted by centrifugation at 100×g for 5 min. After the aspiration of the CWS from the whole cell pellet, the whole cells are ready for biochemical analysis, flow cytometry, staining, or other cellular, molecular biology, and biochemical methods.

Example 4

Whole Cell Isolation Procedure Steps

1. A corresponding kit variation was selected for cell extraction from frozen sarcoma tumor tissue samples.
2. The TSS and CWS solutions were diluted with high purity water 1:4 (TSS:water or CWS:water; v/v).
3. The diluted solutions were placed on ice and chilled for 5 min.
4. Tumor tissue samples were removed from –80° C. storage and placed on dry ice.
5. Tumor tissue samples of 1-5 g were weighed and put back on dry ice.
6. Two volumes of chilled TSS (g/ml) were added to a 10 ml tube.
7. A 1-5 g sample of frozen tumor tissue was placed in a 60 mm petri dish on ice.
8. The frozen sample was sliced quickly into pieces with one punch using a multi-blade cutter.
9. The tumor pieces were transferred to the tube with TSS.
10. The tube (with TSS and samples) was shaken for two minutes and left on ice for 3 min for form an extraction mixture.
11. The extraction mixture was pipetted with a soft plastic pipette for 3-5 min.
12. The turbidity of the supernatant was observed to determine whether to stop or continue the pipetting.
13. The supernatant containing whole cells was collected into a new 10 ml tube on ice using a funnel.
14. The tumor stroma material was washed with 1 ml of CWS, and the supernatants were combined using the same funnel.
15. The supernatant collection was repeated into another 15 ml centrifuge tube using a new funnel.
16. The stroma material was discarded.

17. The supernatant was centrifuged at 100×g for 5 min to form a pellet containing whole cells.
18. The supernatant containing blood and soluble stroma components was aspirated.
19. The pellet contained whole cells.
20. The cell pellet was washed with 0.2-1 ml of CWS depending on the cell pellet volume.
21. The washed cell pellet was centrifuged at 100×g for 5 min.
22. The supernatant was aspirated.
23. The whole cells were collected.

The whole cells were then ready for further analysis, or for storage at −80 degrees C. overnight before analysis. To demonstrate that the extracted cells from the frozen sarcoma tumor samples contained cancerous cells, AgNOR staining was used. All cells showed multiple nucleoli within the nuclei. Nucleolar hypertrophy is a hallmark of malignant cells. The method accordingly demonstrated the ability to extract whole malignant cells from frozen tumor tissue samples.

Example 5

Biochemical Characterization of Malignant Cells within a Tumor Tissue

Figure 4:
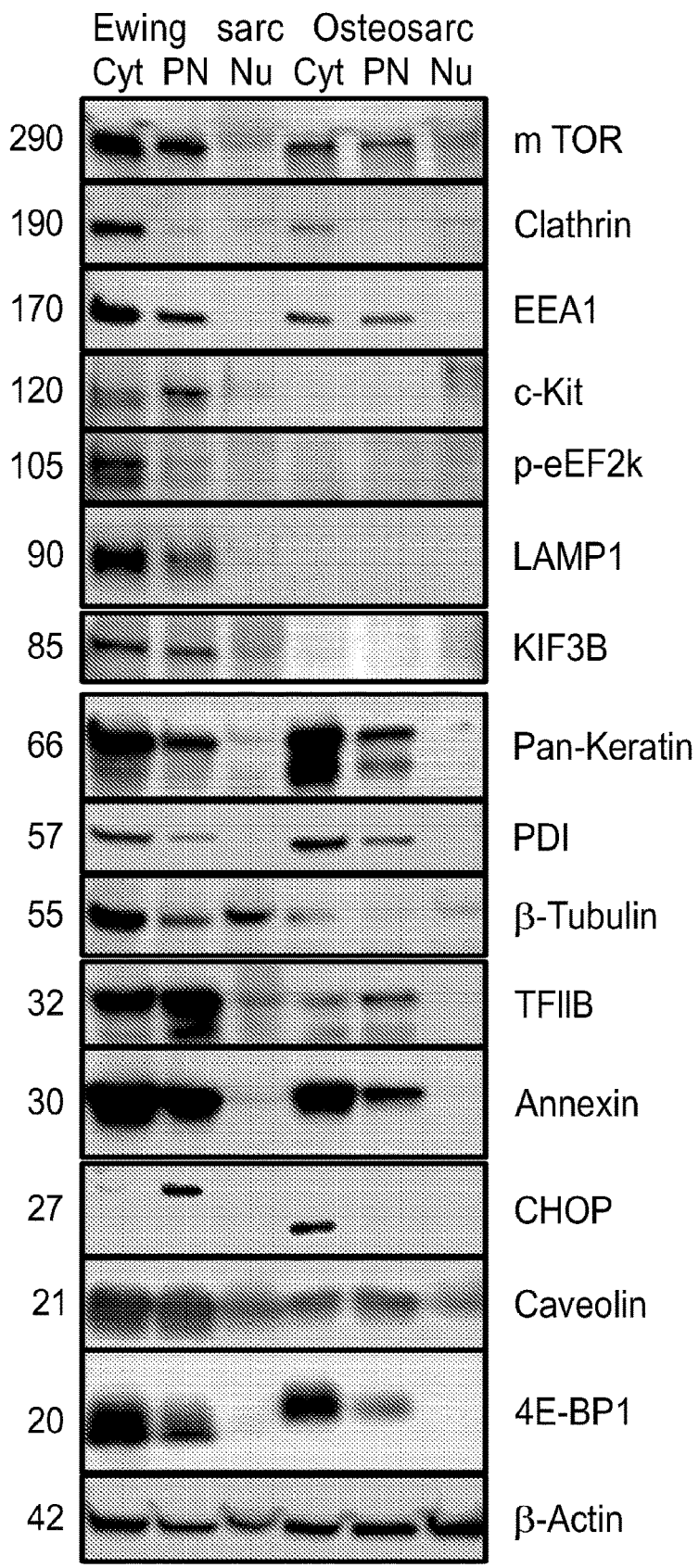
FIG. 4 shows results of Western Blot analysis of expression levels of specific proteins from whole tumor cells isolated from mouse Ewing sarcoma and osteosarcoma tumors according to embodiments of methods herein.

The importance of embodiments herein for whole tumor cell extraction from frozen tumor tissues for cancer research can be demonstrated by the application of embodiments of methods herein for the biochemical characterization of actual tumors (see FIG. 4). Malignant cells were isolated from mouse Ewing sarcoma and osteosarcoma tumors and analyzed for selected key proteins. Cytosolic ("Cyt"), perinuclear ("PN"), and nuclear ("Nu") proteins were separated by polyacrylamide gel electrophoresis, followed by western blotting. Although both tumors have the same origin of sarcomas, the protein translation rates were different in corresponding malignant cells. Ewing sarcoma had a higher protein biosynthesis rate than the osteosarcoma.

The mTOR kinase level and its substrates can be used to estimate the protein synthesis capacity of the cell. Mammalian mRNA translation is mainly regulated by mTORC1 (mechanistic target of rapamycin complex 1) and eIF4E1 (eukaryotic translation-initiation-factor 4E). It has been shown that mTOR regulates cap-dependent mRNA translation through 4E-BP1 (eIF4E-Binding Protein 1). 4E-BP1 binds to eIF4E to prevent translation initiation. mTORC1 phosphorylation of 4E-BP1 dissociates the complex and results in the initiation of protein synthesis. The low levels of mTOR lead to lesser phosphorylation of the 4E-BP1, which obstructs mTOR-dependent protein translation.

Less phosphorylated 4E-BP1 can be detected by a slower mobility in the gel (FIG. 4). Low levels of protein synthesis require reduced protein degradation. One of the key organelles involved in protein digestion is the lysosome. The protein degradation markers such as LAMP1 and p-eEF2k were not detected in osteosarcoma cells. LAMP1 (Lysosomal-Associated Membrane Protein 1) is a marker protein for the lysosome. Eukaryotic elongation factor 2 kinase (eEF2k) is a protein kinase that negatively regulates the elongation step of protein synthesis. The absence of both proteins in osteosarcoma cells reflects a low protein degradation rate in these tumor cells. Endosomal trafficking (EEA1), scaffolding (Caveolin and Annexin), coating (Clathrin), proto-oncogen (c-Kit) and kinesin (KIF3B) proteins demonstrated a lower intensity of the band in osteosarcoma cells. Apparently, the biosynthesis of these essential proteins is mTOR-dependent. Transcription factors (CHOP, TFIIB) were localized in the perinuclear network (PN) and differed in their electrophoretic mobility. The keratin proteins are detected in the cytosol and at the PN but contain different isoforms. Beta-actin was ubiquitous and also served as a control protein. The startling differences of selected protein levels within two tumors of the same origin show that the technology preserves a biochemical identity of the original tumor and the authenticity of the malignant cells, which is difficult to maintain in cell lines cultured with the standard growth media.

Example 6

Application of Tumor Cell Isolation for Tumor Fingerprinting

Figure 5:
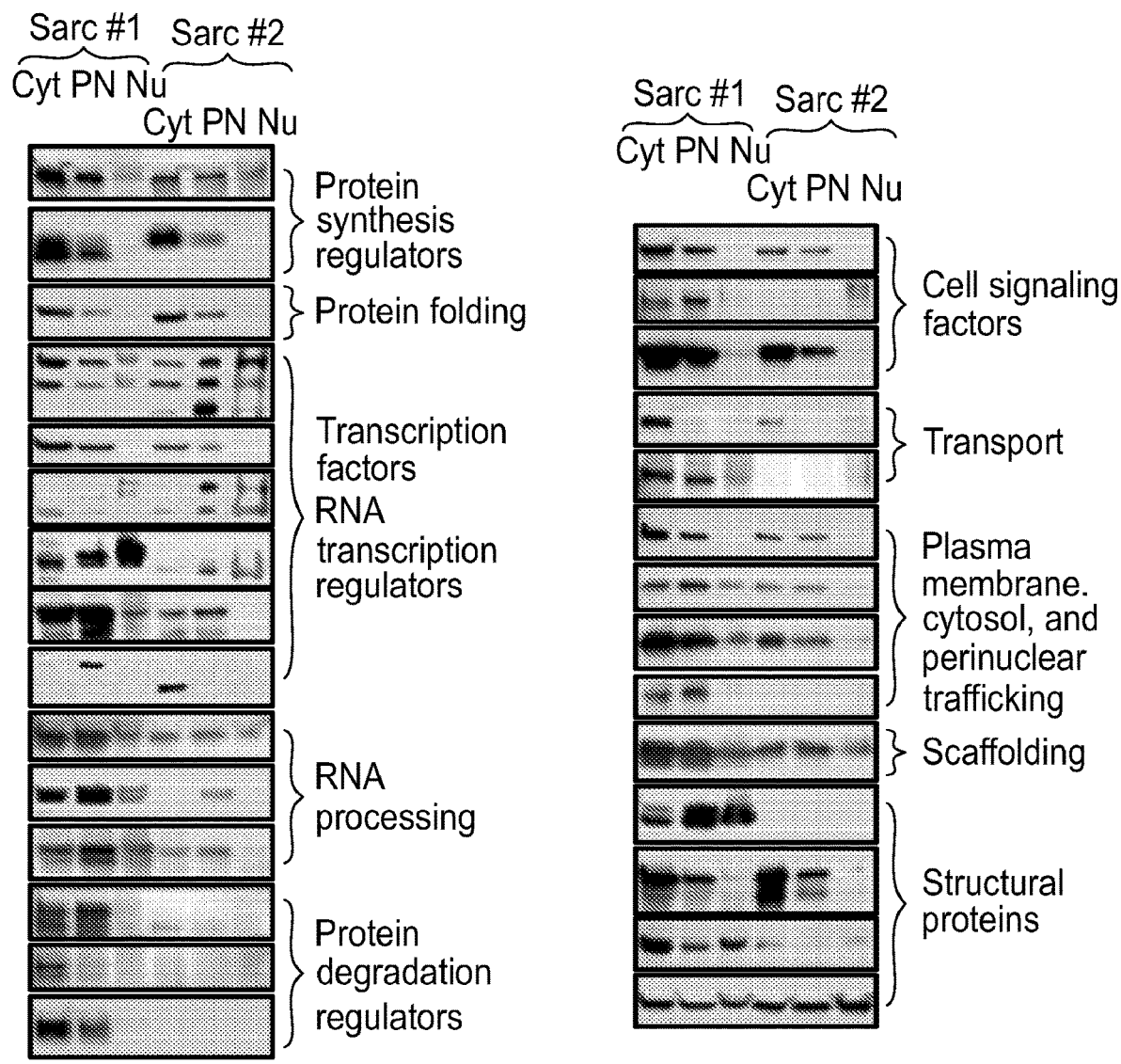
FIG. 5 shows results of sodium dodecyl sulfate-polyacrylamide gel electrophoresis (SDS-PAGE) separation and Western Blot detection of protein expression levels from two types of mouse sarcoma cells isolated from flash-frozen tumor tissues according to embodiments of methods herein.

SDS-PAGE separation and Western Blot detection of proteins expressed in two types of mouse sarcoma tumor tissues (Sarcoma #1 and Sarcoma #2) are shown in FIG. 5. Malignant cells were isolated from mouse Sarcoma #1 and Sarcoma #2 tumors and analyzed for selected key proteins. Cytosolic ("Cyt"), perinuclear ("PN"), and nuclear ("Nu") proteins were separated by polyacrylamide gel electrophoresis, followed by western blotting. Sarcoma #1 and Sarcoma #2 differ in their protein synthesis capacity, as shown by the levels of protein synthesis regulators. Protein levels and electrophoretic shift shows that Sarcoma #1 has a higher capacity for protein synthesis. Higher protein synthesis correlates with the protein degradation in Sarcoma #1. Transcription factors that regulate RNA differ in tumors by the protein levels and electrophoretic shift. Cell signaling, RNA processing, transport, trafficking, and even structural proteins, differ between the Sarcoma #1 and Sarcoma #2 cells.

Conclusion

The technology of cell isolation from flash-frozen tumors allows researchers to isolate malignant cells for tumor fingerprinting.

What is claimed is:
1. A method of isolating whole cells from a frozen tissue sample comprising:
 (a) providing a frozen tissue sample, wherein the frozen tissue sample contains whole cells and stroma material;
 (b) cutting the frozen tissue sample into two or more tissue pieces using a tissue sample cutter, wherein the tissue sample cutter has a plurality of cutting blades;
 (c) forming an extraction mixture by incubating the two or more tissue pieces in a volume of tissue sample solution (TSS) for an incubation period;
 (d) forming a whole cell sample by pipetting a first portion of the extraction mixture from the tissue sample solution into an extraction pipette, and then
 (e) pipetting a second portion of the extraction mixture from the extraction pipette into a washing solution; and
 (f) collecting isolated whole cells from the whole cell sample by flowing the extraction mixture through a first separation funnel into a collection vessel.

2. The method of claim 1, provided that stroma material is present in the whole cell sample, further comprising reducing an amount of stroma material in the whole cell sample by flowing the extraction mixture through a second separation funnel into a second collection vessel.

3. The method of claim 1, wherein the tissue sample is a tumor sample, or the whole cells are tumor cells.

4. The method of claim 1,
wherein the tissue sample has a weight of from about 1 gram to about 5 grams, or
wherein the two or more tissue pieces have a width of from about 2 mm to about 6 mm or
wherein the incubation period is from about 3 minutes to about 5 minutes, or
wherein incubating the tissue pieces includes shaking the extraction mixture during a portion of the incubation period; or
wherein the pipetting is performed for a pipetting period of from about 1 minute to about 15 minutes.

5. The method of claim 2, including further reducing an amount of stroma material in the whole cell sample by flowing the washing solution from the first collection vessel through the first separation funnel or from a second separation funnel into a second collection vessel.

6. The method of claim 1, further comprising:
(a) forming a pellet of whole cells by centrifuging the washing solution in the collection vessel;
(b) removing the washing solution from the collection vessel;
(c) forming a washed cell suspension by suspending the pellet in a volume of cell wash solution (CWS);
(d) forming a washed cell pellet and a washed cell supernatant by centrifuging the washed cell suspension of step (c); and
(e) forming a sample of isolated whole cells by removing the washed cell supernatant of step (d) from the washed cell pellet.

7. The method of claim 6, wherein the centrifuging is performed at a gravitational force of from about 80 g to about 120 g and for a centrifuge period of from about 3 minutes to about 7 minutes.

8. The method of claim 6, wherein the TSS includes from about 10 mM to about 40 mM Hepes, from about 0 mM to about 120 mM KCl, from 0 mM to about 150 mM NaCl, from 0 mM to about 10 mM $MgCl_2$, from 0 µM to about 2 µM $CaCl_2$), and from 0% to about 10% glycerol; or
wherein the CWS includes from about 10 mM to about 40 mM Hepes, from 0 mM to about 120 mM KCl, from 0 mM to about 150 mM NaCl, from 0 mM to about 10 mM $MgCl_2$, from 0 µM to about 2 µM $CaCl_2$), and from 0% to about 10% glycerol.

9. The method of claim 1, wherein the TSS includes at least one protease inhibitor, at least one phosphatase inhibitor, at least one DNase inhibitor, at least one RNase inhibitor, or a combination thereof.

10. The method of claim 9, further comprising performing at least one biochemical analysis on the isolated whole cells.

11. The method of claim 10, wherein the at least one biochemical analysis includes protein analysis, phosphorylated protein analysis, nucleic acid analysis, or a combination thereof.

12. The method of claim 1, further comprising maintaining the frozen tissue at a temperature below 0 degrees Celsius before and during cutting, or at a temperature of about 0 degrees Celsius to about 4 degrees Celsius before and during cutting.

* * * * *